Feb. 26, 1924.  
W. F. SCHÖNLAND, JR  
1,484,741  
PROCESS FOR FLUSHING AND STUFFING SAUSAGE CASINGS  
Filed Sept. 28, 1923

Inventor:  
William F. Schönland, Jr.  
by Charles S. Gooding  
Atty.

Patented Feb. 26, 1924.

1,484,741

UNITED STATES PATENT OFFICE.

WILLIAM F. SCHÖNLAND, JR., OF MANCHESTER, NEW HAMPSHIRE.

PROCESS FOR FLUSHING AND STUFFING SAUSAGE CASINGS.

Application filed September 28, 1923. Serial No. 665,282.

*To all whom it may concern:*

Be it known that I, WILLIAM F. SCHÖNLAND, Jr., a citizen of the United States, residing at Manchester, in the county of Hillsborough and State of New Hampshire, have invented new and useful Improvements in Processes for Flushing and Stuffing Sausage Casings, of which the following is a specification.

This invention relates to an improved process for flushing and stuffing sausage casings.

Heretofore, the casings of sausages, which vary from five to eighty feet in length, pass through a flushing operation before being fed on to the stuffing tube of a sausage stuffing machine. This flushing operation rinses and flushes out the inside of the casing and also makes it easier to handle during the stuffing operation. In the flushing operation, one end of the casing is slipped over the end of a tube through which water is passing, the rest of the casing is then worked on to the tube until the entire length has been flushed. It is then taken off and fed on to the sausage stuffing tube in the same manner as on to the flushing tube and the stuffing operation then commences.

It is the object of this invention to provide a continuous process for flushing and stuffing sausage casings.

In carrying the process into effect a sausage stuffing tube is utilized having a water passage whereby the casing may be flushed as it is being fed on to the sausage stuffing tube and a meat passage whereby the casing may be stuffed after the flushing operation has been completed.

Referring to the drawings:—

Like numerals refer to like parts throughout the several views of the drawings.

Figure 1:
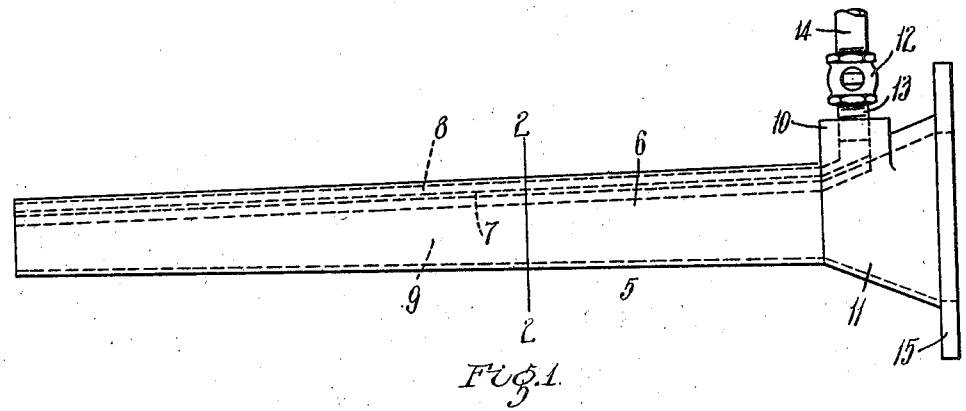
Figure 1 is a side elevation of a sausage stuffing tube whereby my improved process may be carried into effect which when in use is fastened to a sausage stuffing machine, not shown in the drawings, in a manner well known to those skilled in the art.
Figure 2:
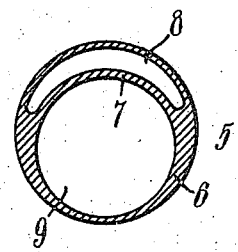
Fig. 2 is an enlarged detail cross section taken on line 2—2 of Figure 1.

In the drawings, 5 is the sausage stuffing tube of a sausage stuffing machine which consists of a frusto-conical portion 6 cylindrical in cross section and provided with a partition 7, which forms two passages 8 and 9. The passage 8 extends from the front end to the rear end of the frusto-conical portion 6 and terminates in a boss 10 in a frusto-conical portion 11 of the sausage stuffing tube. A valve 12 is connected to the boss 10 by means of a pipe 13. Another pipe 14 has screw-threaded engagement with the other end of the valve 12 and is connected with the water supply. By means of the valve 12, the flow of water through the passage 8 is controlled.

At the rear end of the sausage stuffing tube 6, adjacent the frusto-conical portion 11, is provided a flange 15 by means of which the sausage stuffing tube is fastened to the sausage stuffing machine. A valve located on said sausage stuffing machine controls the passing of meat through the passage 9. This valve and sausage stuffing machine are not shown in the drawing, but are well known to those skilled in the art.

Figure 3:
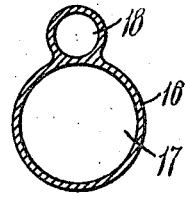
Fig. 3 is a cross section of a modified form of sausage stuffing tube.

The preferred form of tube illustrates the frusto-conical portion 6 as cylindrical in cross section as this is the most practical shape. The water passage 8 in this form is somewhat crescent shaped. However, the sausage stuffing tube may be made in various shapes, so long as it has embodied therein a meat passage and a water passage, and in Fig. 3 I have illustrated another form in which the tube 16 is not cylindrical in shape, but has embodied therein a meat passage 17 of approximately the same dimensions as in the preferred form and a water passage 18 which is cylindrical in cross section.

The operation whereby my process may be carried into effect is as follows:—Assuming the tube to be fastened to the sausage stuffing machine and the pipe 14 connected to the water supply, one end of a sausage casing is pulled over the end of the tube 6. At this time the valve 12 is operated to cause enough water to flow through the passage 8 to sufficiently flush the casing. The rest of the casing is then pulled over the end of the tube 6 and as this is being done the entire length of the casing is flushed. The end of the casing last pulled on is subsequently pulled off enough to be held between the fingers so that the end becomes closed. The valve on the sausage stuffing machine is then opened and sausage meat is forced through the tube 6 and into the casing until the entire length of the casing is worked off from the tube 6 by the pressure of meat going into it from the sausage stuffing machine.

I claim:

The process of flushing and stuffing sausage casings which consists in pulling a sausage casing on to a tube with a water passage and a meat passage therein, and causing water to flow through said water passage and casing while so doing, then stopping the flow of water through said water passage and closing the outer end of the casing, then forcing meat through said meat passage and into the casing, whereby the casing is filled with meat and pushed off the tube.

In testimony whereof I have hereunto set my hand in presence of two subscribing witnesses.

WILLIAM F. SCHÖNLAND, Jr., [L. S.]

Witnesses:
GEORGE MEISEL,
ALFRED H. DITTRICH.